United States Patent [19]
Klick

[11] Patent Number: 5,236,476
[45] Date of Patent: Aug. 17, 1993

[54] AIR PURIFICATION SYSTEM FOR ENCLOSED ARENAS

[76] Inventor: Ronald C. Klick, 2301 N. Second St., Minneapolis, Minn. 55411

[21] Appl. No.: 839,837

[22] Filed: Feb. 21, 1992

[51] Int. Cl.[5] .............................................. B01D 19/00
[52] U.S. Cl. ........................................ 55/212; 55/473; 55/385.2; 55/DIG. 35; 454/187; 454/245; 454/287; 454/289; 472/92
[58] Field of Search ................. 55/DIG. 35, 473, 212, 55/316, 385.2; 454/187, 239, 245, 287, 289, 229, 231, 232, 233; 62/235; 472/92

[56] References Cited

U.S. PATENT DOCUMENTS

| | | | |
|---|---|---|---|
| 1,429,811 | 9/1922 | Tynam | 454/289 |
| 1,624,226 | 4/1927 | Elters | 454/289 |
| 3,747,671 | 7/1973 | Schwitzer | 454/239 |
| 3,950,155 | 4/1976 | Komiyama | 55/210 |
| 4,530,272 | 7/1985 | Stokes | 454/187 |
| 4,726,824 | 2/1988 | Staten | 55/274 |
| 5,086,692 | 2/1992 | Welch et al. | 454/187 |

*Primary Examiner*—Bernard Nozick
*Attorney, Agent, or Firm*—Palmatier, Sjoquist & Helget

[57] ABSTRACT

The invention relates to an air circulation and filtration system for use with an indoor ice-skating arena. The air circulation and filtration system consists of intake and return air panels which replace and simulate in substantially all respects the boundary "boards" commonly used in indoor ice-skating facilities. The circulation and filtration system remains designed to remove undesirable gases such as carbon monoxide, carbon dioxide, nitrogen dioxide, and exhaust gases emanating from ice resurfacing machinery, from the ice-skating areas used by skaters. The return air panels contain a plurality of angularly offset air passage apertures which direct an air circulation course within an indoor ice-skating arena. The angularly offset air passage apertures promote a circular air course proximal to the ice-skating surface. The location of the intake air panels also promotes a circular air flow course. The filtration system significantly reduces the volume of undesirable gases exposed to skaters, thereby significantly improving the comfort of persons using indoor ice-skating facilities.

13 Claims, 4 Drawing Sheets

AIR PURIFICATION SYSTEM FOR ENCLOSED ARENAS

BACKGROUND OF THE INVENTION

Indoor ice-skating arenas provide shelter for various types of sporting events and recreational activities. The indoor ice-skating ares generally include a refrigerated ice surface defined by and contained within boundaries called "boards". The ice surface generally is rectangular in shape with rounded corners. Transparent plexiglass is usually mounted vertically to the top portion of the boards to protect spectators from injuries which may occur from contact with shot hockey pucks.

The refrigerated ice surface of an indoor ice-skating arena occasionally requires resurfacing by the use of equipment powered by internal combustion engines, a common example of which includes a Zamboni ™.

Spectator seating generally surrounds the "boards" of an indoor ice-skating arena. The spectator seating usually extends in a step manner horizontally outward and vertically upward from the boards and ice surface.

Skaters using indoor ice-skating facilities will frequently engage in strenuous physical activities necessitating heavy breathing. Skaters exhale a significant volume of carbon dioxide while using an indoor ice-skating facility. In addition, ice resurfacing equipment exposes the air proximal to the refrigerated ice surface to exhaust fumes, which include carbon monoxide and/or nitrogen dioxide. The existence of carbon monoxide, carbon dioxide, nitrogen dioxide, and other exhaust gases proximal to the refrigerated ice surface is undesirable and unhealthy to skaters. The existence of undesirable gases proximal to the refrigerated ice surface results in the breathing of these gases by skaters.

Undesirable gases proximal to a refrigerated ice surface descend according to Boyle's Law when cooled by the ice. Undesirable gases usually do not disperse and/or ascend over the top of the plexiglass of an indoor ice-skating arena. Concentration of undesirable gases thereby occurs in areas used by skaters. The "boards" and the plexiglass of an indoor ice-skating arena function to contain and concentrate the undesirable gases.

The air circulation and filtration system of this invention removes undesirable gases from areas of an indoor ice-skating arena used by skaters. The invention creates an air course proximal to a refrigerated ice surface. The intake and return air panels of the circulation and filtration system are designed to imitate and interact with the remaining "boards" of an indoor ice-skating arena. Undesirable gases are filtered from air withdrawn from the ice arena by the invention. Filtered or filtered and cooled air may then be returned to the arena, thereby, significantly enhancing breathing of skaters.

SUMMARY OF THE INVENTION

The present invention relates to an air circulation and filtration system for use with an indoor ice-skating arena.

An object of the invention is to provide a circulation air flow course for indoor ice-skating arenas of relatively simple and inexpensive design, construction, and operation which is safe and durable and which enhances the breathing comfort of skaters without injury to skating participants and/or spectators.

Another object of the invention is to filter and remove undesirable gases such as carbon monoxide, carbon dioxide, nitrogen dioxide, and other exhaust products emanating from ice resurfacing machines from areas of indoor ice arenas used by skaters.

Still another object of the invention is to promote a circular air flow course for air proximal to ice surface of an indoor ice-skating arena.

Still another object of the invention is to return to an indoor ice-skating arena cooled and filtered air, thereby, improving the breathing and comfort of the skaters.

Still another object of the invention is to provide a uniform, regular boundary surrounding the ice-skating surface, thereby eliminating non-uniform bounces of pucks used by hockey players.

A feature of the invention includes an intake air panel designed to imitate and replace a section of the "boards" of an indoor ice-skating arena.

Another feature of the invention includes a plurality of screen sections of the intake air panel which permit entry of air into the air circulation and filtration system without affecting or impacting the structure, strength, or responsiveness of the "boards" of an indoor ice-skating arena.

Still another feature of the invention includes a return air panel designed to imitate and replace a section of the "boards" of an indoor ice-skating arena.

Still another feature of the invention includes a plurality of angularly offset air passage apertures traversing the return air panels, directing an air flow course within the indoor ice-skating arena proximal to the areas used by skaters.

Still another feature of the invention includes a return air panel which returns cooled air from the air circulation and filtration system without affecting or impacting the structure, strength, or responsiveness of the "boards" of an indoor ice-skating arena.

Still another feature of the invention includes a condenser, a fan, a filter, and ducts for connecting the intake and return air panels, thereby defining the circulation and filtration system used in an indoor ice-skating arena.

Still another feature of the invention includes a sensor for triggering engagement of the air circulation and filtration system.

Still another feature of the invention includes a circular air flow course proximal to the portion of the indoor ice-skating arena used by skaters.

DETAILED DESCRIPTION OF THE PREFERRED EMBODIMENTS

Figure 1A:
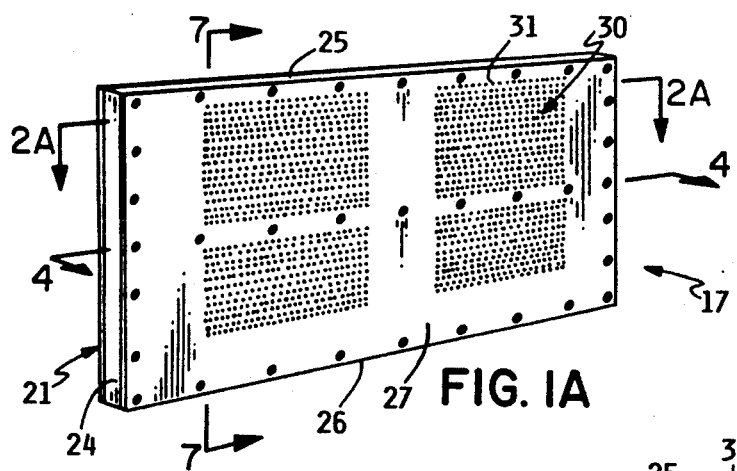
FIG. 1A is an isometric view of an intake air panel of the circulation and filtration system for an indoor ice-skating arena.
Figure 1B:
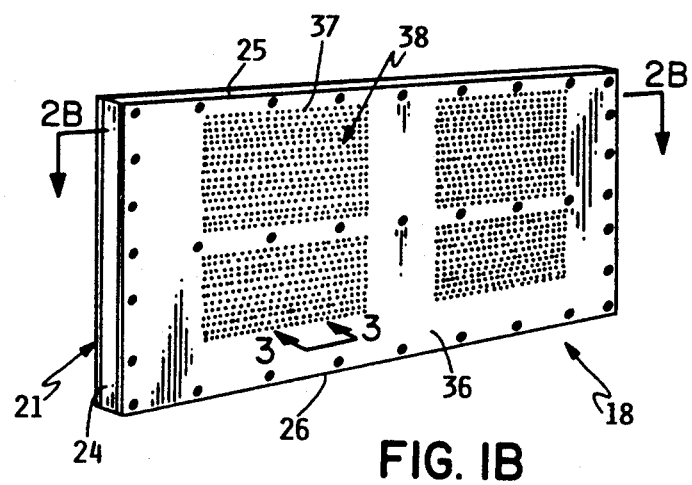
FIG. 1B is an isometric view of a return air panel of the circulation and filtration system for an indoor ice-skating arena.
Figure 3:
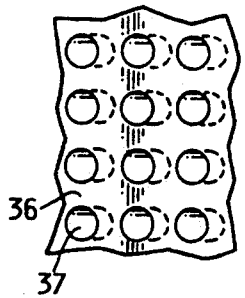
FIG. 3 is a partial phantom line exploded view of the return air panel taken along the line 3—3 of FIG. 1B.
Figure 2A:
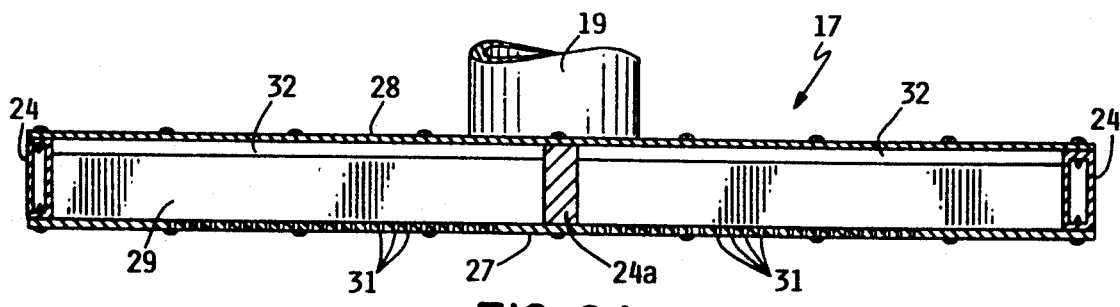
FIG. 2A is a cross-sectional top view of the intake air panel taken along the line of 2A—2A of FIG. 1A.
Figure 2B:
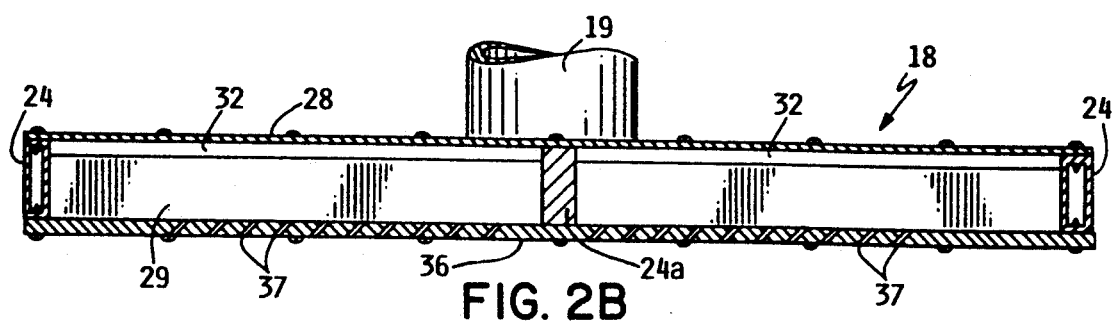
FIG. 2B is cross-sectional top view of the return air panel taken along the line of 2B—2B of FIG. 1B.
Figure 4:
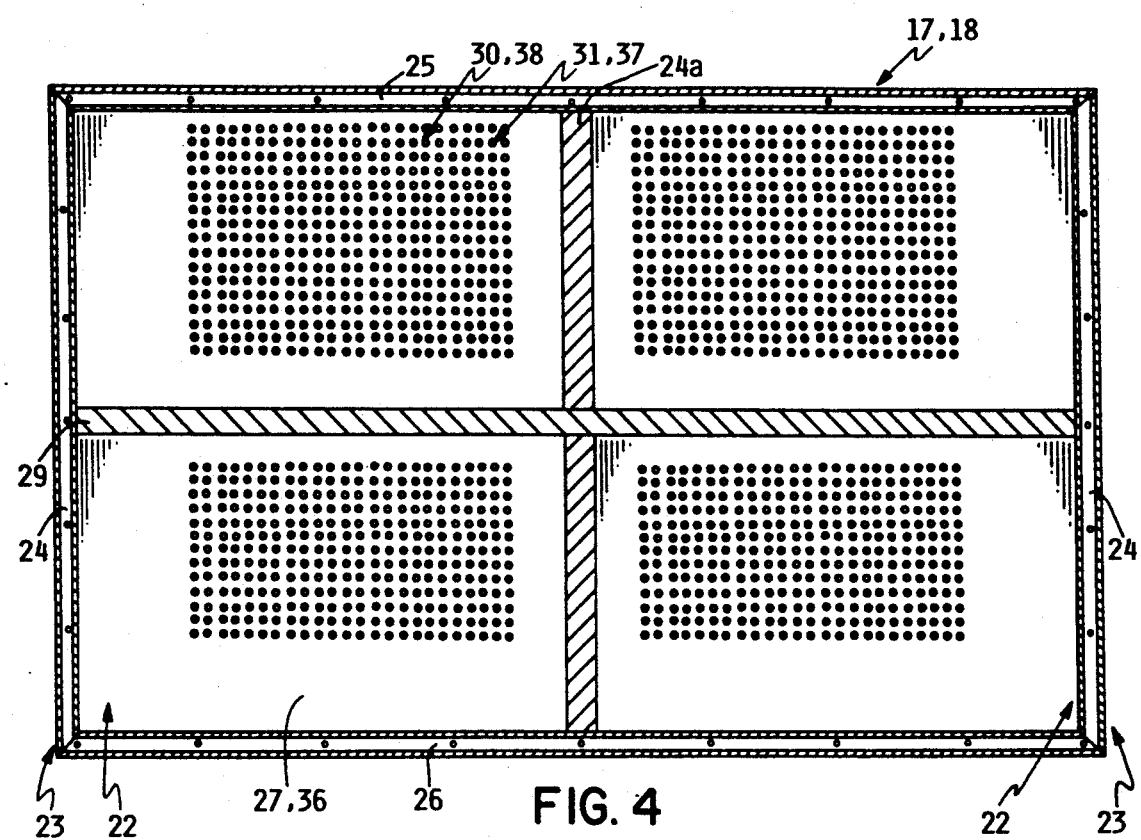
FIG. 4 is a cross-sectional rear view of the intake air panel taken along the line 4—4 of FIG. 1A.

One form of the invention is illustrated and described herein. The air circulation and filtration system for indoor ice-skating arenas is indicated in general by the numeral 10.

Indoor ice-skating arenas include an ice surface 1 surrounded by "boards" 12. Usually a plate of plexiglass is mounted vertically on top of the boards 12. The plexiglass protects spectators from injuries which may occur during a hockey game. Spectator seating is located outside of the boards 12 generally extending outward and upward therefrom.

Individuals skating upon the ice surface 11 will frequently cause the ice surface 11 to become chipped and/or rough. A roughened ice surface 11 requires resurfacing, preferably through the use of mechanical equipment with an internal combustion engine, an example of which includes a Zamboni TM. An ice resurfacing machine, will commonly expel exhaust of carbon monoxide, nitrogen dioxide and/or other undesirable gases. These exhaust gases will frequently become cooled as a result of their proximity to the ice surface 11. Cooled gases descend toward the ice surface 11 according to Boyle's Law. Exhaust gases generally do not ascend above or beyond the plexiglass mounted above the boards 12. Undesirable exhaust gases may remain proximal to the ice surface 11 for inhalation by skaters.

Skaters, particularly when involved in strenuous competitive activities, exhale a significant volume of carbon dioxide. Carbon dioxide gases frequently become cooled by the ice surface 11. The cooled carbon dioxide gases descend toward the ice surface 11.

The air circulation and filtration system 10 for indoor ice-skating arenas generally includes components of a fan 13, a filter 14, a condenser 15, sensors 16, monitors 16a, intake panels 17, return panels 18, and air ducts 19 connecting the various components. (FIG. 6) Preferably air ducts 19 connect the intake panel 17 to the recirculation unit consisting of the condenser 15, the fan 13, and the filter 14. The air ducts 19 further connect the filter 14 to the return air panels 18. Preferably the air duct 19 is partitioned to equally divide air flowing through the circulation and filtration system 10 for return to the indoor ice-skating arena via the return air panels 18. (FIG. 6) The return air panels 18 are preferably located at opposite ends of an indoor ice-skating arena behind the areas commonly used as goals during a hockey game.

Preferably the condenser 15, fan 13, and filter 14 of the air circulation and filtration system 10 remain located below the spectator seating and proximal to the boards 12 and ice surface 11. The condenser 15, fan 13, and filter 14 of the air circulation and filtration system 10 may alternatively be mounted proximal to the ceiling of an indoor ice-skating arena.

Generally the condenser 15 is connected to the fan 13. The fan 13 is also connected to the filter 14. The fan 13 functions to draw air containing undesirable gases from areas proximal to the ice surface 11 for engagement with the air circulation and filtration system 10.

The filter 14 functions to remove undesirable gases, including but not limited to carbon dioxide, carbon monoxide, nitrogen dioxide, and exhaust gases, for purification and return to the ice arena. Preferably, Hopcalite ® catalyst, and/or potassium permanganate material (Purafil ®) 75 is used in the filter 14 for removal of undesirable gases from air engaged with the air circulation and filtration system 10. Hopcalite ® catalyst material is commonly known as a manganese dioxide and a copper oxide mixture, having a chemical formula of $MnO_2$-$CuO$. The hopcalite ® catalyst and/or potassium permanganate ($KMNO_4$) (Purafil ®) material 75 chemically interacts with the undesirable gases thereby purifying the air to be returned to the indoor ice arena from the air circulation and filtration system 10. The filter 14 may contain any suitable material for renewal of undesirable gases from air engaged with the air circulation and filtration system 10.

Figure 8:
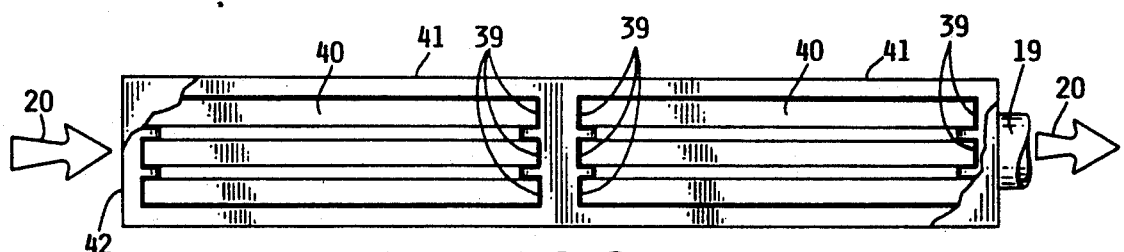
FIG. 8 is a cutaway side view of the filter.
Figure 9:
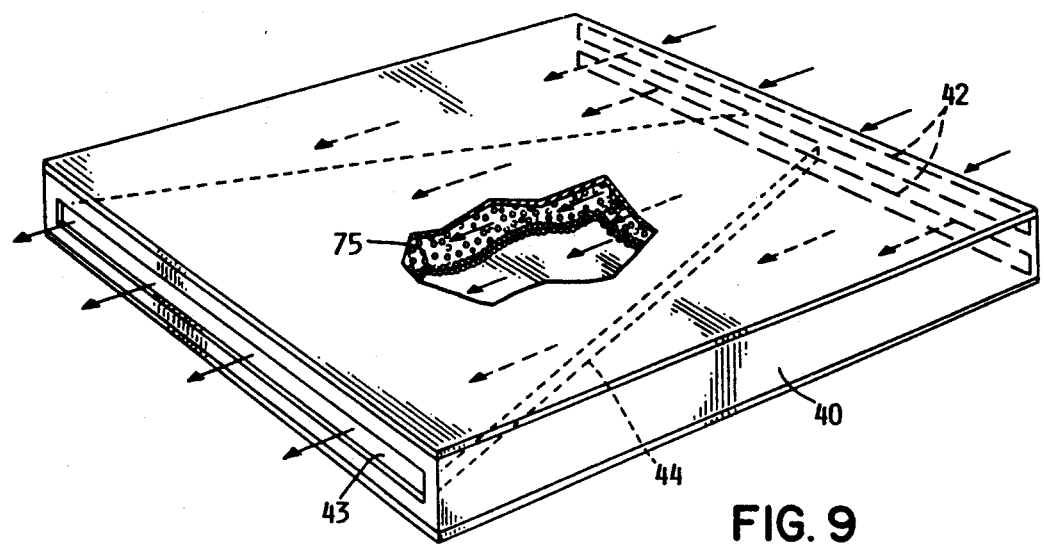
FIG. 9 is a cutaway, isometric, partial phantom line view of a filter panel.

The filter 14 preferably has two sections 41. Each section 41 preferably contains a plurality of pairs of slots 39 adapted for receiving engagement of a filter panel 40. (FIGS. 8, 9) The pairs of slots 39 are preferably positioned for vertical and parallel stacking of the filter panels 40. In operation, air is expelled from the fan 13 for engagement with the filter 14. The expelled air traverses the filter panels 40 for cleansing by either the Hopcalite ® or Purafil ® material 75. The purified air then exits the filter 14 via the duct aperture 34. (FIG. 8) An operator may replace filter panels 40, containing either Hopcalite ® or Purafil ® material 75, in any preferred combination in order to remove escalated concentration levels of a particular undesirable gas. An operator is not restricted to use of a single type of filter material within a section 41 of the filter 14. Flexibility is thereby provided for removal of undesirable gases from the air circulation and filtration system 10.

A filter panel 40 is generally rectangular in shape. A filter panel 40 preferably includes open front and rear faces 42 and 43 respectively. A filter panel 40 may suitably contain either Hopcalite ® or Purafil ® material 75. The Hopcalite ® or Purafil ® material 75 is generally maintained in an angularly disposed position by the membrane 44 within the filter panel 40. The membrane 44 is of sufficient strength and durability to maintain the angularly disposed position of the Hopcalite ® or Purafil ® material 75 within the filter panel 40. (FIG. 7) The membrane 44 is also porous, providing a means for passage of air into the filter material. During operation, air enters the filter 14 at the location of the open front face 42. The air then traverses the porous membrane 44 for engagement to either the Hopcalite ® or Purafil ® material 75. Interaction between the air and the filter material cleanses the air by removal of undesirable gases such as carbon monoxide, carbon dioxide, and nitrogen dioxide. Purified air then exits the filter material at the location of the open rear face 43 for engagement to the second section 41 of filter panels 40. Repeated cleansing of the air occurs in the second section 41 of filter panels 40. The cleansed air then exits the open rear face 43 of the second section 41 of the filter 14 for engagement to the duct aperture 34 and the remainder of the air circulation and filtration system 10. The filter panels 40 may be of any commercially available size provided interaction with the filter 14 and the pairs of slots 39 is maintained. An operator may use any number of sections 41 of filter panels 40 in the air circulation and filtration system 10 of this invention.

The condenser 15 functions to cool the purified air, when necessary, which has previously exited the intake air panels 17. Return of cooled air to the ice arena promotes energy efficiency by reducing the energy required for maintaining a hard ice surface 11. The ice surface 11 will become soft when the temperature proximal to the ice surface 11 increases. Return of warm air to areas proximal to the ice surface 11 results in increased temperature and softness to the ice surface. Soft ice is highly undesirable to skaters.

The sensors 16 are mounted to the boards 12 proximal to the return panels 18. The sensors 16 initiate engagement of the air circulation and filtration system 10 upon detection of a specified concentration of undesirable gases proximal to the ice surface 11. The sensors 16 are electrically connected through a monitor 16a for translation of a signal to the fan 13. The sensors 16 are commercially available and are capable of detecting a concentration level for carbon monoxide of 30 parts per million, or less, hourly weighted on an 8 hour basis and are capable of detecting nitrogen dioxide at a concentration level of 5 parts per million, or less, hourly weighted on an 8 hour basis. Any preferred commercially available sensor 16 may be implemented in the air circulation and filtration system 10 provided the sensor 16 is capable of detecting gases at levels indicated above, which comply with the Minnesota Air Quality Standards governing enclosed sports arenas. A sensor meeting this purpose is identified as Model #483740, manufactured by Mine Safety Appliance (MSA) for nitrogen dioxide and Model #485125, manufactured by Mine Safety Appliance (MSA) for carbon monoxide.

The intake air panels 17 function as the location for entry of air containing undesirable gases into the air circulation and filtration system 10. The intake air panels 17 in structure and appearance imitate the remaining boards 12 of an indoor ice-skating arena.

The return air panels 18 function as the location for exit of purified cooled air from the air circulation and filtration system 10. The return air panels 18 in structure and appearance imitate the remaining boards 12 of an indoor ice-skating arena. The return air panels 18 function to create an air circulation course 20 proximal to the ice surface 11.

The air ducts 19 define the passages for air contained in the air circulation and filtration system 10. The air ducts 19 initiate at the intake panel 17 and extend to the condenser 15. The air ducts 19 exit the filter 14 and split into equal passages for engagement of one air duct 19 to each return air panel 18. (FIG. 6) All components of the air circulation and filtration system 10 are preferably joined in series by the air ducts 19.

The intake air panels 17 consist of a frame 21 having an interior 22 and an exterior 23. The frame 21 is rectangular in shape having normal dimensions of length equal to 96 inches, height equal to 42 inches, and width equal to of 6½ inches. The frame 21 preferably is the size of a typical section of the "boards" 12 of an indoor ice-skating arena and may vary in dimensions accordingly. A section of the boards 12 may therefore be easily replaced by the inclusion of an intake air panel 17. The frame 21 is preferably formed of steel, wood, or any other rigid material providing strength and/or durability, especially when used in conjunction with an ice surface 11 used by hockey skaters/players. The frame 21 is formed of two upright end supports 24, a central upright support 24a, and upper and lower horizontal supports 25 and 26 respectively. The two upright end supports 24, central upright support 24a, and the upper and lower horizontal supports 25 and 26, preferably are formed of solid material providing structural strength and stability to the frame 21. Examples of suitable solid materials are wood or steel. The two upright end supports 24, central upright support 24a, and the upper and lower horizontal supports 25 and 26, preferably are affixed to each other by the use of bolts and nuts, screws, rivets, welding and/or nails.

The interior 22 of the intake air panel 17 is enclosed by the front intake surface 27 and the rear panel surface 28.

Figure 7:
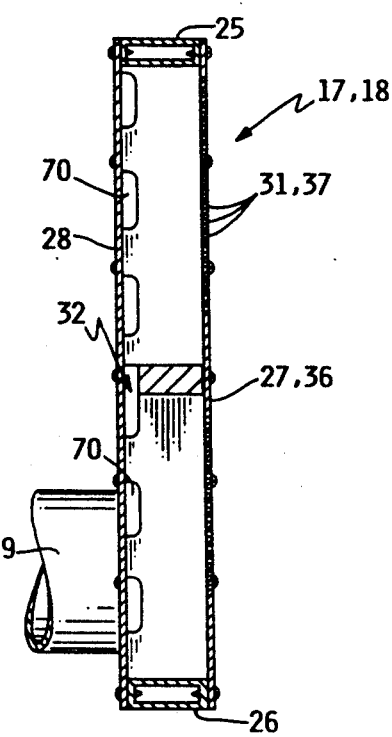
FIG. 7 is an alternative cross-sectional side view of the intake air panel taken along line 7—7 of FIG. 1A.

The central upright support 24a extends between the upper and lower horizontal supports 25 and 26 respectively, preferably positioned equal distances between the two upright end supports 24. Preferably the central upright support 24a is continuously and flushly affixed to both the front intake surface 27 and the rear panel surface 28. Alternatively, the central upright support 24a may contain a plurality of notches 70. (FIG. 7)

A central horizontal support 29 extends between the two upright end supports 24, preferably positioned at equal distances between the upper horizontal support 25 and the lower horizontal support 26. The central horizontal support 29 and the central upright support 24a provide added strength and stability to the intake air panel 17. The central upright support 24a is preferably affixed to the upper and lower horizontal supports 25 and 26 by bolts, nuts, screws, rivets, welding and/or nails. The central horizontal support 29 is preferably affixed to the upright end supports 24 by bolts, nuts, screws, rivets, welding and/or nails. The central upright support 24a is preferably affixed to the central horizontal support 29 by bolts, nuts, screws, rivets, welding and/or nails. The central horizontal support 29 and the central upright support 24a prevent the bending, bowing, fracturing, breaking and/or destruction of the front intake surface 27 when hockey pucks, hockey sticks, and/or skaters collide and/or impact the front intake surface 27. The useful life of the intake air panel 17 is significantly increased by the existence of the central horizontal support 29 and the central upright support 24a. The central horizontal support 29 and the central upright support 24a minimize injuries to skaters by reducing breakage of the front intake surface 27 thereby reducing exposure or contact to a jagged and/or fractured surface.

The front intake surface 27 preferably imitates the boards 12 of an indoor ice-skating arena in all respects. The front intake surface 27 preferably covers the entire interior 22 of the intake air panels 17. The front intake surface 27 extends between the upright end supports 24 and the upper and lower horizontal supports 25 and 26 respectively. The front intake surface 27 is attached to the upright end supports 24, the upper and lower horizontal supports 25 and 26, the central upright support 24a, and the central horizontal support 29 by the use of bolts and nuts, screws, rivets, and/or nails. The front intake surface 27 is preferably formed of sturdy, rigid, and/or durable material such as galvanized steel metal, fiberglass, reinforced wood, and/or polypropylene. The preferred thickness of the front intake surface 27 is between ⅛ and 7/16 inches. The front intake surface 27 is of sufficient strength and durability to not fracture, break, shatter, and/or splinter when struck by hockey pucks, hockey sticks, and/or skaters.

The front intake surface 27 contains a plurality of rectangular arrays 30 of intake air openings 31. Preferably two rectangular arrays 30 of intake air openings 31 are located above the central horizontal support 29, and two rectangular arrays 30 of intake air openings 31 are located below the central horizontal support 29 of the intake air panel 17. Preferably, two rectangular arrays 30 of intake air openings 31 are located on each side of the central upright support 24a of the intake air panel 17.

The width of the central horizontal support 29 is preferably between 4–5 inches. The central horizontal support 29 is offset forwardly with respect to the two upright end supports 24 and the central upright support 24a. The central horizontal support 29 is continuously and flushly affixed to the front intake surface 27. The forwardly offset central horizontal support 29 defines an air passage 32.

The air passage 32 exists between the rear panel surface 28 and the forwardly offset central horizontal support 29. The width of the central horizontal support 29 and the existence of the air passage 32 does not significantly reduce the structural strength and/or durability of the intake air panel 17. The air passage 32 provides an air course for air entering the upper rectangular arrays 30 of intake air openings 31 for engagement with the air ducts 19. The air passage 32 is preferably between $\frac{1}{2}$ and $1\frac{1}{2}$ inches in width.

Air containing undesirable gases proximal to the ice surface 11 may then be drawn through the upper rectangular arrays 30 of intake air openings 31 for passage through the air passage 32 for engagement with the air circulation and filtration system 10. Air containing undesirable gas proximal to the ice surface 11 may also be drawn through the lower rectangular arrays 30 of intake air openings 31 for engagement with the air circulation and filtration system 10 without traversing the air passage 32.

The rear panel surface 28 preferably imitates the boards 12 of an indoor ice-skating arena in all respects. The rear panel surface 28 preferably completely encloses the interior 22 of the intake air panel 17. The rear panel surface 28 extends between the upright end supports 24 and the upper and lower horizontal supports 25 and 26 respectively. The rear panel surface 28 is attached to the upright end supports 24, the upper and lower horizontal supports 25 and 26, and the central upright support 24a by use of bolts and nuts, screws, rivets, and/or nails. The rear panel surface 28 is preferably formed of sturdy, rigid, and/or durable material such a galvanized steel metal, fiberglass, reinforced wood, and/or polypropylene. The rear panel surface 28 preferably is constructed of sufficient strength and durability to not fracture, break, shatter, and/or splinter when the front intake surface 27 is struck by hockey pucks, hockey sticks, and/or skaters.

Figure 5:
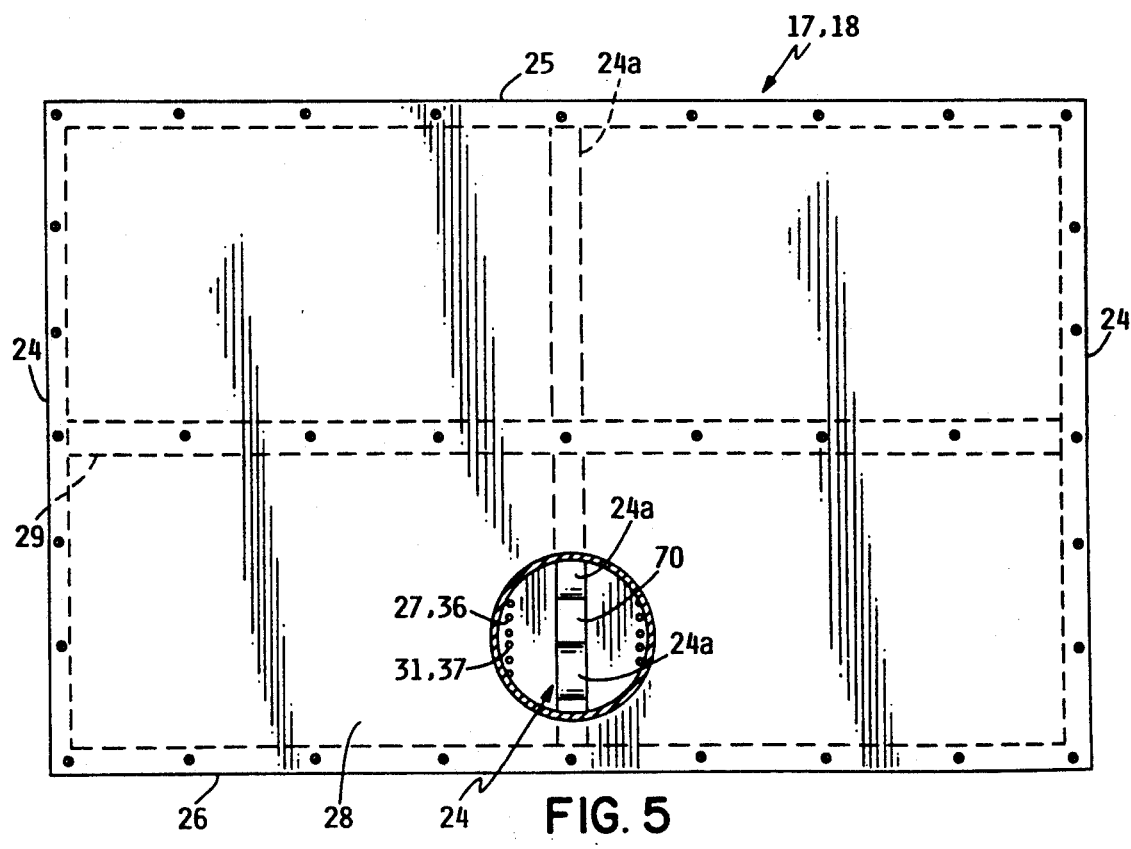
FIG. 5 is a partial phantom line rear view of the return air panel.

The rear panel surface 28 preferably contains a duct aperture 34 suitably adapted for engagement to the air ducts 19 of the air circulation and filtration system 10. The duct aperture 34 may be either circular, with a diameter of 12-18 inches, or rectangular, having a size of at least 144 square inches. The air ducts 19 are affixed to the duct aperture 34 by any suitable means, including but not limited to screws, and/or rivets. The junction between the duct aperture 34 and the air ducts 19 forms an airtight seal. Preferably the duct aperture 34 is located centrally through the rear panel surface 28, below the central horizontal support 29, and proximal to the lower two rectangular arrays 30 of intake air openings 31. The duct aperture 34 is preferably positioned so that the central upright support 24a vertically and centrally traverses the duct aperture 34, thereby creating two equal sized portions. Air then may enter the air circulation and filtration system 10 from either side of the central upright support 24a. (FIG. 5) An alternative embodiment is provided in FIG. 7 showing a plurality of notches 70. The notches 70 provide the means for air entering the intake air panels 17 to laterally traverse the central horizontal support 24a for engagement with the air circulation and filtration system 10 via the duct aperture 34 and the ducts 19. The notches 70 may be milled into the central upright support 24a as desired by an operator. An operator may also mill apertures through the central horizontal support 29 to provide for additional air passages 32, so long as the structural strength and integrity of the intake air panels 17 is not sacrificed.

Preferably the front intake surface 27 and the rear panel surface 28 are affixed to the frame 21 such that an airtight seal is maintained. Access to the air circulation and filtration system 10 is thereby limited to the passage of air through the rectangular arrays 30 of intake air openings 31.

Through bolts and nuts may traverse the upright end supports 24 in order to provide a mechanism for the releasable engagement of the intake air panel 17 to the boards 12 of an indoor ice-skating arena. In operation, the through bolts may be tightened to provide for the flush, sturdy, and continuous engagement between the intake air panel 17 and boards 12 of the indoor ice-skating arena. The through bolts significantly enhance the ease of replacement, and/or releasable engagement, of the intake air panel 17 to the boards 12 of an indoor ice-skating arena. The intake air panel 17 may be affixed to the remaining boards 12 of the indoor ice-skating arena by any conventional and/or preferred means. The above illustrated method of attachment is not intended to be limiting, but is intended to show the varied embodiments this invention may take.

An intake air panel 17 replaces a section of the boards 12 of an indoor ice-skating arena proximal to the center ice area of the ice surface 11. At least one section of the boards 12 is replaced by an intake air panel 17. Preferably two or three adjacent intake air panels 17 are used as a portion of the air circulation and filtration system 10. The intake air panels 17 imitate in color, strength, size, and appearance the sections of the boards 12 which are replaced during installation of the air circulation and filtration system 10. The intake air panels 17 are adapted for the vertical mounting of a desired size of plexiglass above the upper horizontal support 25, imitating the remaining boards 12 of an indoor ice-skating arena in all respects.

The intake air panel 17 provides the means for air containing undesirable gases to enter the air circulation and filtration system 10 while simultaneously maintaining the strength, stability, and/or integrity of the boards 12 of an indoor ice-skating arena.

The features of the intake air panel 17 remain identical to the features of the return air panel 18 in all desired aspects with the exception of the front return surface 36. The front return surface 36 remains distinguishable from the front intake surface 27 by substitution of a plurality of angularly offset air passage apertures 37 for the plurality of intake air openings 31. The plurality of angularly offset air passage apertures 37 traverse the front return surface 36. The angularly offset air passage apertures 37 are normally the same diameter as the corresponding intake air openings 31 of the intake air panel 17. The angularly offset air passage apertures 37 are arranged to form a rectangular pattern 38 similar to the rectangular arrays 30 of the intake air panel 17. Two rectangular patterns 38 are located above and below the central horizontal support 29 of the return air panel 18. Two rectangular patterns 38 are located on each side of the central upright support 24a of the return air panel 18.

Figure 6:
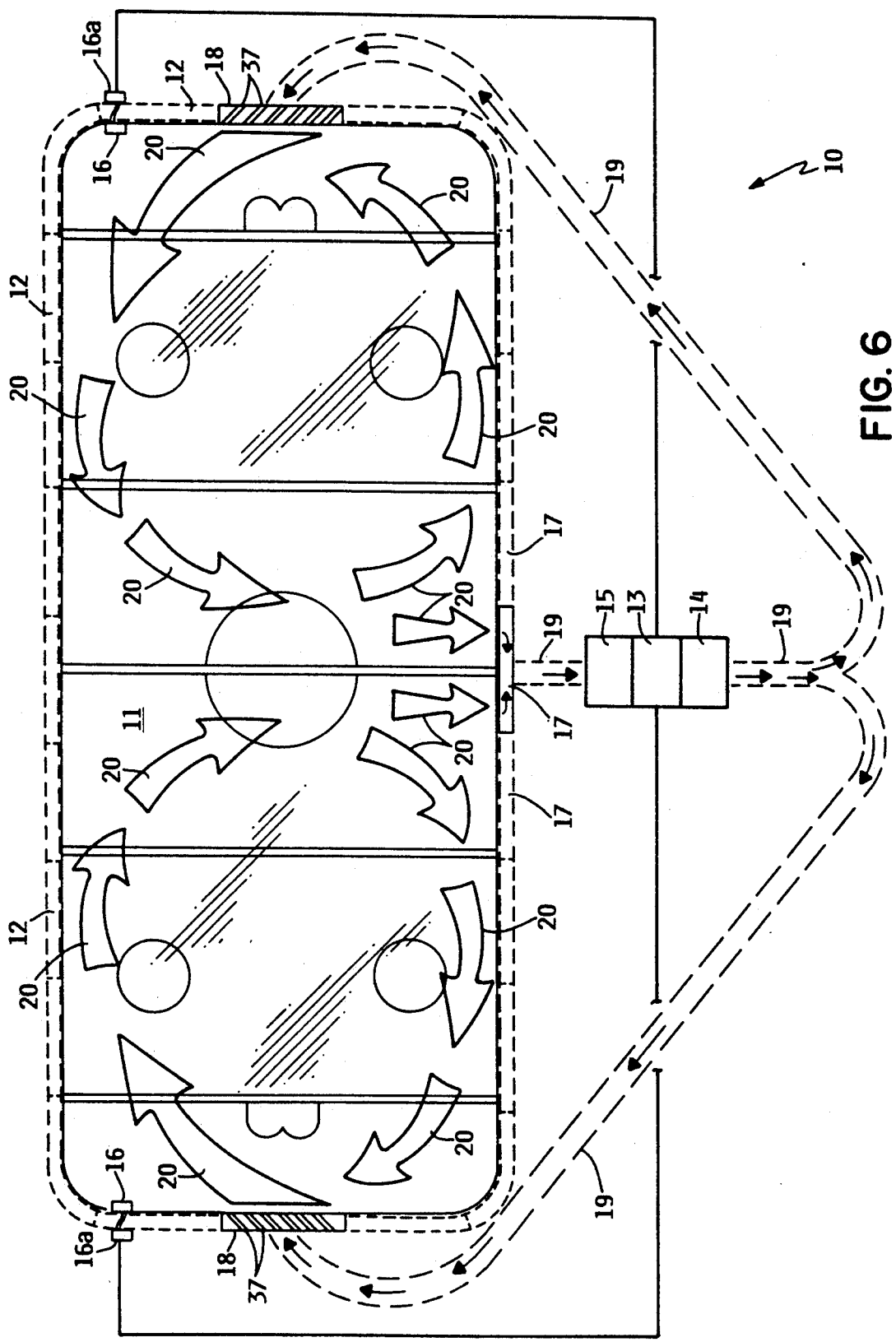
FIG. 6 is a block diagram partial phantom line environmental view of the air circulation and filtration system and air course.

The angularly offset air passage apertures 37 traverse the front return surface 36 at a preferred angle of 45° with respect to the perpendicular, thereby directing exiting air flow away from, or distal to, the intake air panel 17. (FIG. 6) The angularly offset air passage apertures 37 are of sufficient length to create a circular air flow course 20 as illustrated in FIG. 6. The angularly offset air passage apertures 37 may extend into the interior 22 of the return panel 18. Alternatively, the front return surface 36 may be of sufficient thickness for extension of the angularly offset air passage apertures 37 for the desired length.

Filtered, cleaned air may be returned from the air circulation and filtration system 10, to the portion of the indoor ice-skating arena proximal to the ice surface 11, by exit from the rectangular patterns 38 of angularly offset air passage apertures 37. The air passage 32 provides the means for air exiting the ducts 19, to traverse the central horizontal support 29 for engagement to either the upper or lower rectangular patterns 38 of angularly offset air passage apertures 37.

At least two return air panels 18 replace sections of the boards 12 of an indoor ice-skating arena proximal to the end ice areas of the ice surface 11. The return air panels 18 provide the means for filtered cleansed air to exit from the air circulation and filtration system 10 for return to areas of an indoor ice-skating arena proximal to the ice surface 11.

The return air panels 18 also are adapted for flush, sturdy, and continuous engagement to the remaining boards 12 of an indoor ice-skating facility, simulating the remaining boards 12 in color, structure, and appearance in all desired respects.

The angularly offset air passage apertures 37 are directed away from, or distal to, the intake air panels 17. A circular air course 20 is thereby created. Air exiting the return air panels 18 initially travels around the boards 12 opposite the intake air panels 17. Cleansed air exiting from one return air panel 18 then engages the cleansed air exiting from the opposite return air panel 18, proximal to the center ice portion of the ice surface 11. The colliding cleansed air then mixes and travels toward the intake air panels 17 for repeated engagement to the air circulation and filtration system 10. A circular air course 20 is thereby created by the angularly offset air passage apertures 37 which direct an air flow course proximal to the ice surface 11.

Air returned to areas proximal to the ice surface 11 by the return air panels 18 mixes with air containing undesirable gases located proximal to the ice surface 11. The mixing of cleansed and/or cleansed and cooled air exiting the return air panels 18 with air containing undesirable gases significantly reduces the concentration of the undesirable gases, thereby enhancing breathing ease of skaters. The circular air flow course promotes interaction between air proximal to the ice surface 11 and the air circulation and filtration system 10 for removal of undesirable gases from air breathed by skaters.

In operation the sensors 16 detect a predetermined concentration level of undesirable gases proximal to the return air panels 18 and the ice surface 11. The sensors 16 then electrically signal the monitor 16a which in turn signals the fan 13 to initiate air circulation within the air circulation and filtration system 10. The fan 13 draws air proximal to the ice surface 11 through the rectangular arrays 30 of intake air openings 31 of the intake air panels 17. The drawn air then engages the duct aperture 34 for engagement with the ducts 19 of the air circulation and filtration system 10. The fan 13 then draws air through the ducts 19 for cooling by the condenser 15. Air exiting the condenser 15 enters the fan 13. The fan 13 then expels the air for engagement with the filter 14. Air interacting with the filter 14 becomes cleansed by the removal of undesirable gases such as carbon dioxide, nitrogen dioxide, and carbon monoxide. The fan 13 then pushes the cooled, cleansed air through the partitioned ducts 19 for interaction with the duct aperture 34 of the return air panel 18. The fan 13 then pushes the cleansed, cooled air through the rectangular patterns 38 of angularly offset air passage apertures 37 for return to areas proximal to the ice surface 11. The return air panels 18 remain located at opposite ends of an indoor ice-skating facility, preferably behind areas used as goals during hockey games. The completion of the air circulation and filtration system 10 results upon exit of the cleansed, cooled air from the angularly offset air passage apertures 37 of the return air panels 18. The sensors 16, following the lapse of a predetermined period of time, signal the monitor 16a, and ultimately the fan 13 to cease engagement of the air circulation and filtration system 10. The sequential arrangement of the condenser 15, fan 13, and filter 14 of the air circulation and filtration system 10, may be suitably arranged in any preferred order.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A circulation and filtration system for an indoor ice-skating arena having a plurality of board sections surrounding an ice surface having a center ice area and end ice areas comprising:
   (a) a first board section positioned adjacent said center ice area of said ice-skating arena, said first board section comprising:
      (i) a frame defining the periphery of said first board section;
      (ii) a front surface engaged to said frame, said front surface covering said frame, said front surface having a plurality of openings therethrough comprising a first air panel;
      (iii) a rear surface engaged to said frame opposite to said front surface, wherein said rear surface covers said frame;
      (iv) at least one support defining an air passage between said front surface and said rear surface, wherein said support traverses said frame; and
      (v) at least one opening through said rear surface;
   (b) a second air panel in a second board section;
   (c) a duct means engaged to said opening through said rear surface, said duct mans confining an air flow course between said first air panel and said second air panel;

(d) an air filter connected in air flow relation to said duct means;

(e) an air fan connected in air flow relation to said duct means;

(f) at least one gas sensor for detection of undesirable gases selected from the group consisting of carbon monoxide, carbon dioxide, and nitrogen dioxide, said sensor affixed to one of said plurality of board sections inside said ice-skating arena proximal to said ice surface; and (g) a condenser connected in air flow relation to said duct mans.

2. The circulation and filtration system according to claim 1, wherein said first board section is approximately 6½ inches in width, 42 inches in height, and 96 inches in length.

3. The circulation and filtration system according to claim 1, wherein a plurality of air passage apertures traverse said support of said first board section.

4. The circulation and filtration system according to claim 1, wherein said first air panel is the location for the intake of air entering said duct means.

5. The circulation and filtration system according to claim 1, wherein said first board section is comprised of rigid polypropylene, wood, or fiberglass material.

6. The circulation and filtration system according to claim 6, wherein all of said board sections have uniform dimensions and coloring.

7. The circulation and filtration system according to claim 1, wherein said second board section further comprises:

(a) a frame defining the periphery of said second board section;

(b) a front surface engaged to said frame, said front surface covering said frame said front surface having a plurality of angularly offset air passage apertures therethrough comprising said second air panel;

(c) a rear surface engaged to said frame opposite to said front surface, wherein said rear surface covers said frame;

(d) at least one support defining an air passage between said front surface and said rear surface, wherein said support traverses said frame; and e) at least one opening through said rear surface engaged to said duct means.

8. The circulation and filtration system according to claim 7, wherein all of said board sections have uniform dimensions and coloring.

9. The circulation and filtration system according to claim 10, wherein said second board section is positioned adjacent to said end ice area of said indoor ice-skating arena in substitution for one of said plurality of board sections.

10. The circulation and filtration system according to claim 11, wherein said second board section is comprised of rigid polypropylene, wood, or fiberglass material.

11. The circulation and filtration system according to claim 12, wherein said second board section angularly offset air passage apertures are directed to cause a circular air flow course in said indoor ice-skating arena.

12. The circulation and filtration system according to claim 7, wherein a plurality of air passage apertures traverse said support of said second board section.

13. The circulation and filtration system according to 7, wherein said second air panel is the location for the return of air exiting said duct means.

* * * * *

UNITED STATES PATENT AND TRADEMARK OFFICE
CERTIFICATE OF CORRECTION

PATENT NO. : 5,236,476
DATED : August 17, 1993
INVENTOR(S) : Ronald C. Klick

It is certified that error appears in the above-identified patent and that said Letters Patent is hereby corrected as shown below:

Column 4, line 11, "hopcalite" should be -- Hopcalite --.
Claim 1, column 10, line 65, "mans" should be -- means --.
Claim 6, column 11, line 27, "claim 6" should be -- claim 5 --.
Claim 9, column 12, line 16, "claim 10" should be
-- claim 8 --.
Claim 10, column 12, line 21, "claim 11" should be
-- claim 9 --.
Claim 11, column 12, line 25, "claim 12" should be
-- claim 10 --.

Signed and Sealed this

Eighth Day of March, 1994

Attest:

BRUCE LEHMAN

Attesting Officer     Commissioner of Patents and Trademarks